Figure 1:
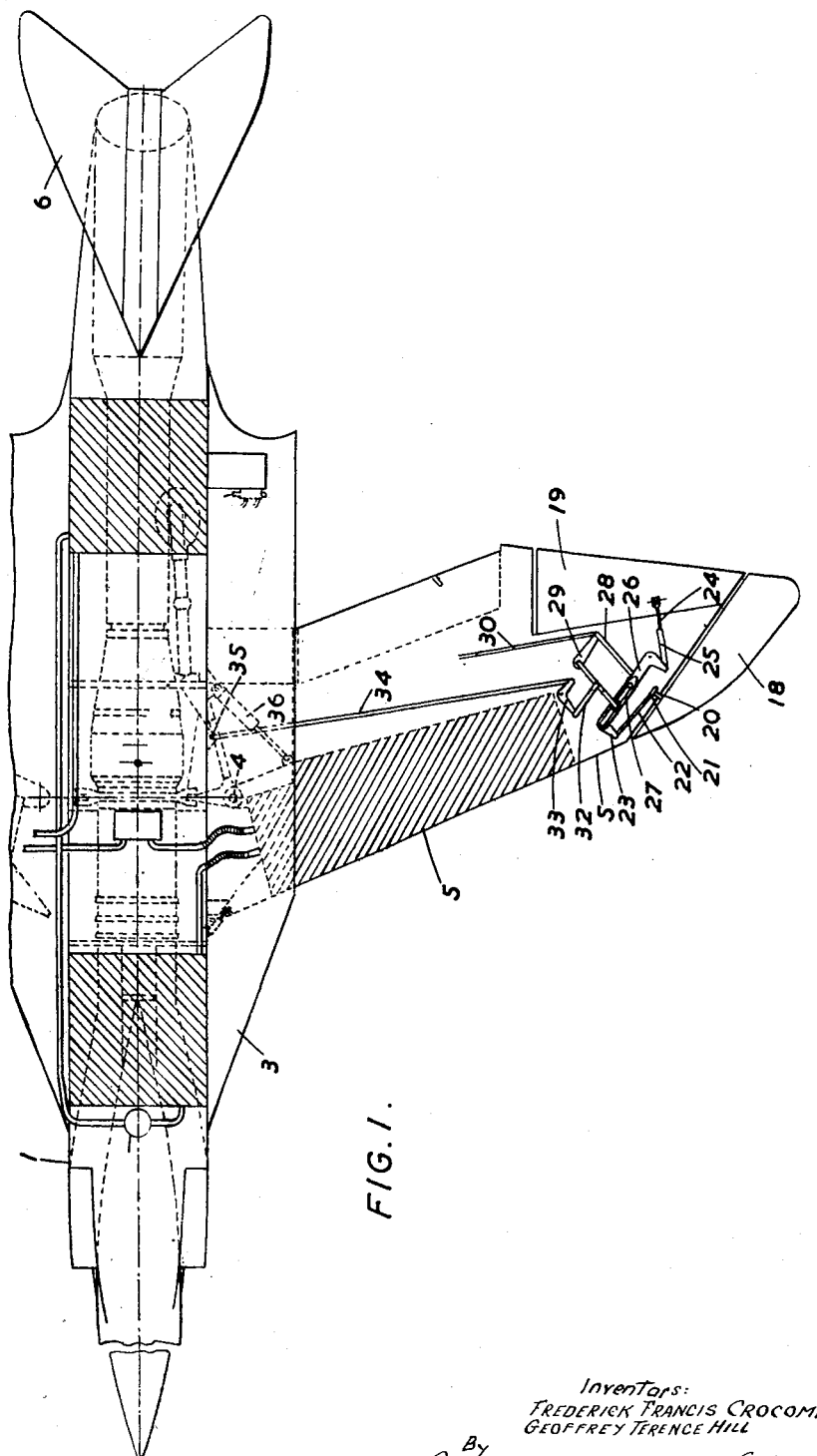

Jan. 5, 1954  F. F. CROCOMBE ET AL  2,665,085
SELECTIVE DUAL AILERON CONTROL FOR AIRCRAFT
Original Filed June 13, 1950  4 Sheets-Sheet 1

Inventors:
FREDERICK FRANCIS CROCOMBE
GEOFFREY TERENCE HILL
By Richardson, David and Nordon
Attorneys Jan. 5, 1954     F. F. CROCOMBE ET AL     2,665,085
SELECTIVE DUAL AILERON CONTROL FOR AIRCRAFT
Original Filed June 13, 1950     4 Sheets-Sheet 2

Inventors:
FREDERICK FRANCIS CROCOMBE
GEOFFREY TERENCE HILL
By
Richardson, David and Nordon
Attorneys

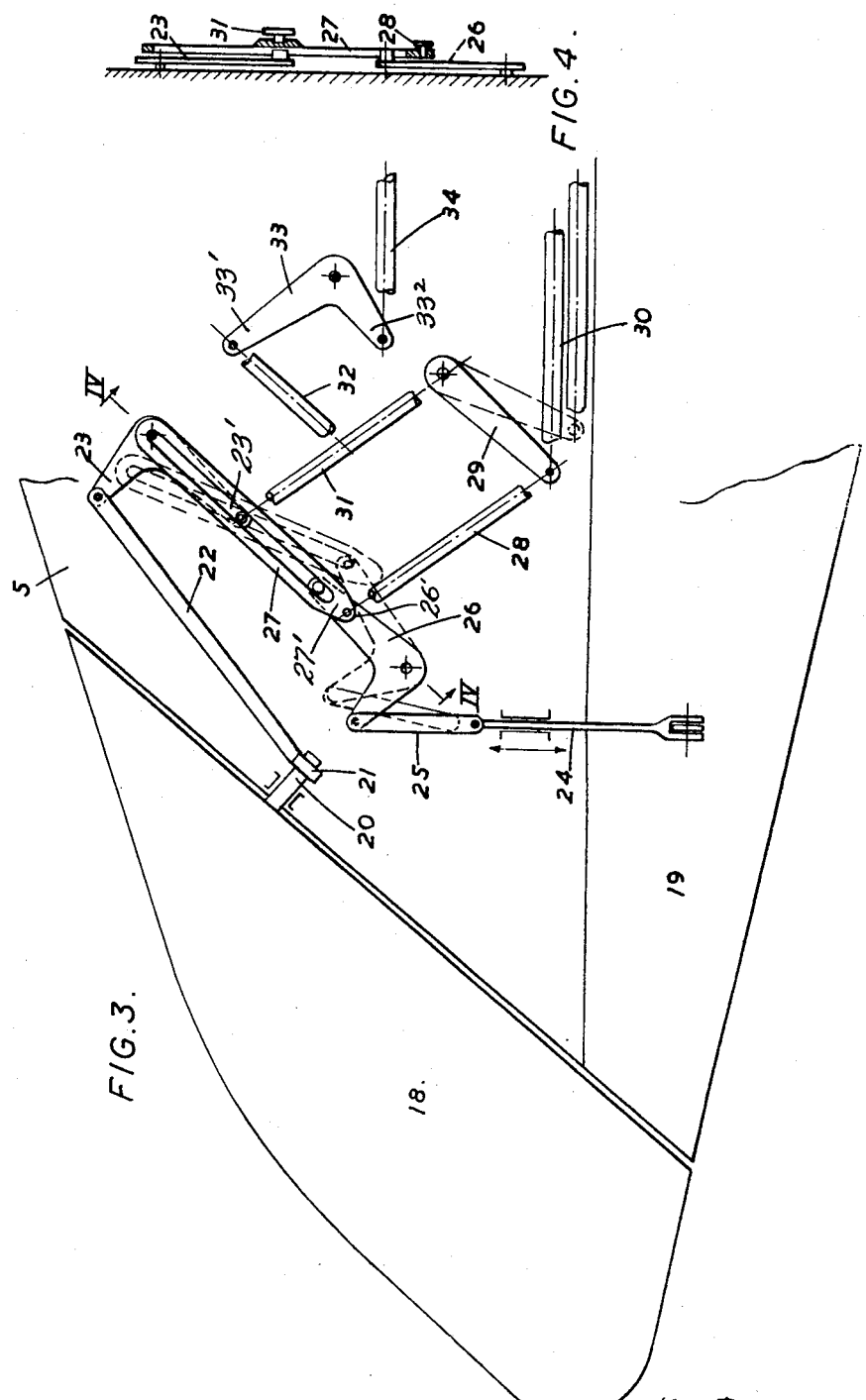

Jan. 5, 1954  F. F. CROCOMBE ET AL  2,665,085
SELECTIVE DUAL AILERON CONTROL FOR AIRCRAFT
Original Filed June 13, 1950  4 Sheets-Sheet 4

Inventors:
FREDERICK FRANCIS CROCOMBE
GEOFFREY TERENCE HILL
By
Richardson, David and Nordon
Attorneys

Patented Jan. 5, 1954

2,665,085

UNITED STATES PATENT OFFICE

2,665,085

SELECTIVE DUAL AILERON CONTROL FOR AIRCRAFT

Frederick F. Crocombe, Gerrard's Cross, England, and Geoffrey T. Hill, Londonderry, Northern Ireland, assignors to Blackburn and General Aircraft Limited, Brough, England, a British company Original application June 13, 1950, Serial No. 167,718. Divided and this application November 27, 1951, Serial No. 258,312

3 Claims. (Cl. 244—49)

This application is a division of our abandoned application Serial No. 167,718, filed June 13, 1950.

This invention relates to aircraft and particularly to high speed aircraft of the kind in which the wings may be swung back from a low speed flight condition in which they are spread substantially normal to the aircraft centre line to a high speed flight condition in which they are swept back at an acute angle to give a delta shape wing plan form.

In the low speed range with the wings spread appreciable movements are required of control surfaces governing the lateral trim of the aircraft but in the high speed range much smaller movements are sufficient and therefore the pilot might excessively move the control surfaces unless means are provided for limiting his movement on the actuating control.

Now one object of the present invention is to provide an aircraft having hinged wings in which each wing is provided with two lateral control surfaces one for use in the low speed range and the other for use in the high speed range and the appropriate control surface is automatically brought into controllable operation by the movement of the wings from one flight condition to the other.

A further object of the invention is to provide such an aircraft in which the operating mechanism controlling the respective lateral control surfaces is such that equal movement of the pilot's actuating control effects proportional movements of the control surfaces, i. e. a movement which will give a large movement to the control surface for low speed flight will give a proportionately small movement to the control surface for high speed flight according to which control surface is at that time effective without requiring any adjustment by the pilot.

To these ends according to the present invention, the aircraft has hinged wings of the nature set forth and each wing has a pivotally mounted tip operable for lateral control at high speed only when the wings are swept back and a trailing edge aileron operable for lateral control at low speed only when the wings are spread.

Further according to the present invention, the wing tip and the trailing edge aileron are operated through a mechanism connected to a fixed point eccentric to the hinge axis of the wing such that the mechanism is conditioned to actuate the appropriate control surface automatically on movement of the wing from spread to sweptback position and vice versa.

Still further according to the present invention, the mechanism controlling the pivotal movements of the wing tip and trailing edge aileron incorporates levers such that equal movements of an actuating member gives proportional movements of the operable control surface, i. e. large angular movements to the aileron or small rotational movements to the wing tip.

According to yet another feature of the invention the movements of an actuating member are taken to a rockable elongated slotted member and levers operatively connected to the wing tip and aileron respectively engage in the slot of such member which is itself connected for bodily movement to a fixed point eccentric to the hinge axis of the wing such that rocking of the slotted member moves the lever operating the one control surface when its fulcrum is concentric with the point of engagement of the lever of the other control surface and the slotted member is moved bodily as the wing is moved from its one position to the other to change the operation from the one such lever to the other.

Throughout this specification high speed and low speed are relative terms and the latter means the speed of flight at take off up to cruising speed whilst the former means higher speeds into the sonic region.

Now in order that the invention may be clearly understood and readily carried into effect, an embodiment thereof is, by way of example, hereinafter more fully described with reference to the accompanying drawings which are given for purposes of illustration only and not of limitation.

Figure 2:
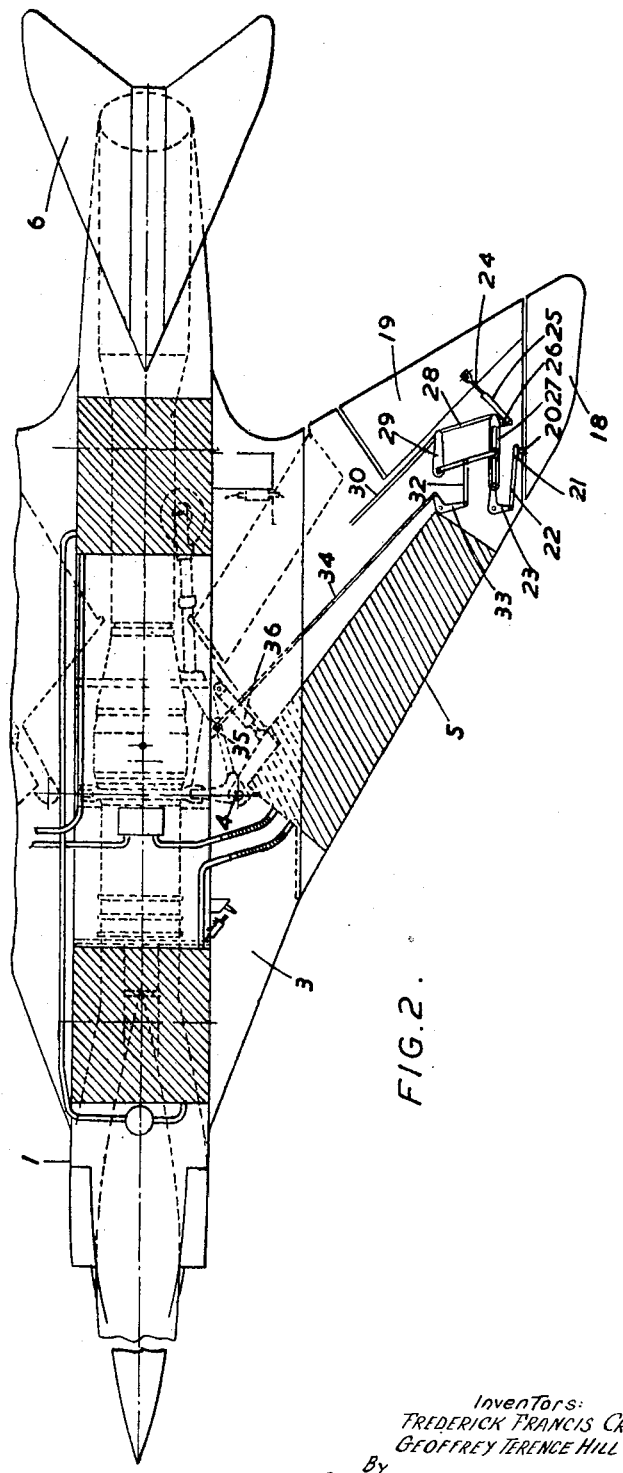
Figure 5:
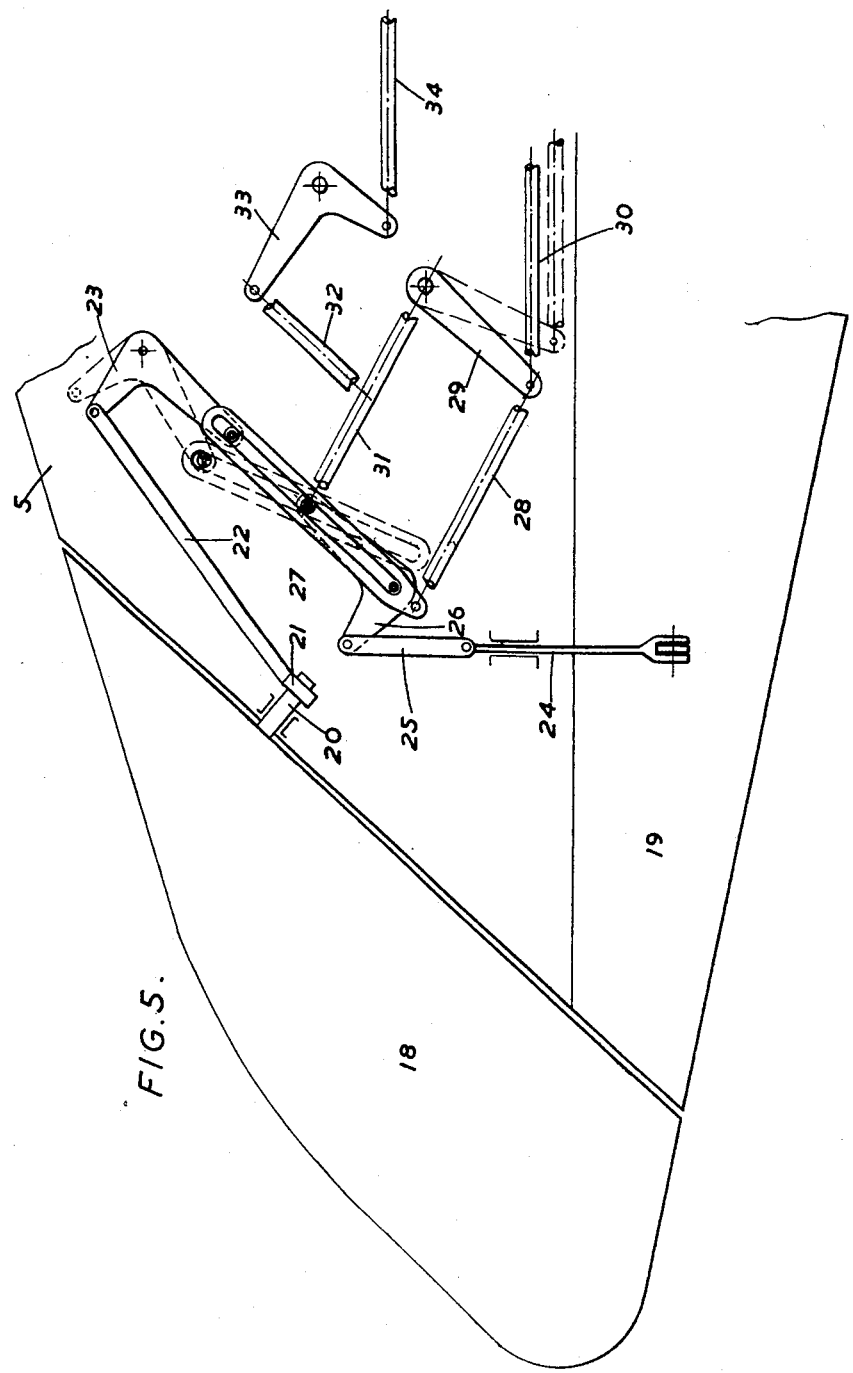

In these drawings:

Figure 1 is a fragmentary sectional plan view showing the aircraft with its wings spread and illustrates the operating gear controlling the movable wing tip and trailing edge aileron, Figure 2 is a view similar to Figure 1 with the wings swung back to their swept-back position, Figure 3 is a detail view on a larger scale showing the mechanism for alternatively operating the movable wing tip and the trailing edge aileron with the mechanism in the position to lock the wing tip and allow movement of the aileron as when the wing is spread, Figure 4 is a view on the line IV—IV of Figure 3, and Figure 5 is a view similar to Figure 3 with the mechanism in alternative position to lock the aileron and allow movement of the movable wing tip as when the wing is swept back.

Referring now to the said drawings, and in particular to Figures 1 and 2 thereof, the invention is illustrated as applied to an aircraft of the nature of that described in United States patent application Serial No. 167,718, and now abandoned, and having an elongated fuselage 1 with a lateral extension 3 on each side within which is pivoted at 4 a wing 5 which is mounted to be capable of swinging movement about the hinge 4 from a spread position substantially normal to the longitudinal axis of the aircraft as illustrated in Figure 1, to a swept-back position in which the wings 5 are sharply swept back at an acute angle and with the extensions 3 make up a wing plan of substantially delta form as illustrated in Figure 2. The rear end of the fuselage 1 carries an all-moving surface empennage 6 comprising a short fin supporting pivotally mounted tail planes at a dihedral angle. A turbo-jet engine is provided within the fuselage in the region of the centre of gravity and the efflux pipe from such engine extends out through the rear extremity of the fuselage, whilst combustion air is taken in at intakes at the front of the fuselage.

Each wing terminates in a pivotally mounted wing tip aileron 18 and is also provided with a hinged trailing edge aileron 19. The shaft 20 (see also Figures 3 and 5) of the wing tip 18 has a lever 21 fast thereon which is connected by a link 22 to a bell crank lever 23. Similarly the operating member 24 of the aileron 19 is connected as through a link 25 to a bell crank lever 26. The free limbs of the bell crank levers 23, 26 engage in the slot of an elongated member 27 which is at one end 27' connected to a part 28 which is connected to a lever 29 to which is also connected an operating rod 30 movable under the pilot's control. The elongated slotted member 27 (see Fig. 4) is also connected in any suitable manner, for example, by usual pivotal connections, to one end of a part 31 the other end of which conveniently pivots on the axis of the lever 29 and this part 31 is intermediate its length connected by a link 32 to one limb 31¹ of a bell crank lever 33, the other limb 33² of which is connected by a rod 34 to a fixed part 35 of the aircraft fuselage eccentric to the hinge 4 of the wing 5.

Thus when the wings 5 are spread, the mechanism is in the position illustrated in Figures 1 and 3 and the fulcrum point of the elongated slotted member 27 is positioned over the end of the free limb 23' of the bell crank lever 23 so that axial movement of the control rod 30 in rocking the elongated slotted member 27 rocks the bell crank lever 26 to effect angular displacement of the trailing edge aileron 19 to govern lateral movements of the aircraft.

As the wing 5 moves back into its swept-back position, the eccentric positioning of the point 35 of connection of the rod 34 to the fuselage 1 with respect to the hinge axis 4 of the wing 5 is such that there is a virtual movement of the rod 34 with respect to the wing which progressively rocks the bell crank lever 33 to move the part 31 and hence the elongated member 27 until, in the swept-back position (as in Figures 2 and 5), the fulcrum of the elongated slotted member 27 coincides with the end of the free limb 26' of the bell crank lever 26 when the movement of the control rod 30 through to the elongated slotted member 27 causes that member to rock the bell crank lever 23 and hence the lever 21 to rotate the movable wing tip 18 about the axis of its shaft 20.

If at the time when the wing is moved from spread to swept-back position, or vice versa, the operable control surface, i. e. wing tip 18 or the trailing edge aileron 19 is displaced for the purpose of lateral control of the aircraft, that displacement is progressively proportionally transferred to the other control surface automatically with the movement of the wing and the former is appropriately restored to its zero position in which it is finally held during continued effective operation of the other control surface.

The movements of the parts as already described are in terms of the two control surfaces being in their zero position. In this position one control surface is free to move whilst the other has its operating parts at the dead centre position so that no movement occurs and it is virtually locked.

If the changeover of the wing position and hence of the control surface occurs while the operable control surface is displaced there is a displacement of slotted member 27 which is maintained during the change and there is hence a proportional displacement of the newly effective control surface whilst the operating parts of the other reach zero locked position.

The wing position may thus be changed without having first to zeroise the lateral control surfaces and the pilot does not need to make any adjustment of his control or alter the extent of operation thereof during high and low speed flight and changing from one to the other.

The lengths of the control surfaces operating members, namely the lever 21 and link 22 effective on the wing tip 18 and operating member 24 and link 25 effective on the trailing edge aileron 19 are so dimensioned that similar extents of movement of the actuating control rod 30 and hence of the pilot's control through the respective bell crank levers 23, 26 impart proportional and different movements in the same sense to the control surfaces, i. e. large angular movements to the trailing edge aileron 19 and small rotational movements to the wing tip 18.

It is to be understood the invention is not limited to the design of aircraft shown in the drawings, as it may be applied to any aircraft having wings which may swing between spread and swept-back positions.

We claim:

1. An aircraft having an aileron control system, said aircraft having pivotally mounted wings displaceable between a slow speed position extending substantially normal to the center line of the aircraft and a high speed swept-back position at an acute angle with respect to said center line, said aircraft having pivotally mounted wing tip ailerons for use with said wings in said high speed position and trailing edge ailerons in said wings for use with said wings in said low speed position, said control system comprising: aileron control means operable by a pilot of said aircraft; wing tip aileron control means connected to vary the position of said wing tip ailerons; trailing edge aileron control means connected to vary the position of said trailing edge ailerons; linkage means interconnecting said pilot operable aileron control means, said wing tip aileron control means and said trailing edge aileron control means and disposed selectively to connect either said wing tip aileron control means or said trailing edge aileron control means for control by said pilot operable aileron control means; and means responsive to the position of said wings and connected to said linkage means for rendering said selective connection effective with respect to said wing tip ailerons with said wings in said high speed position and effective with respect to said trailing edge ailerons with said wings in said low speed position.

2. A control system according to claim 1, further comprising: means including said linkage means for selectively locking either said wing tip aileron control means or said trailing edge aileron control means in a predetermined fixed position, either of said aileron control means which is connected through said linkage means to said pilot operable control means being unaffected by said locking means.

3. A control system according to claim 1, wherein said linkage means comprises a first bell crank lever connected to said wing tip aileron control means; a second bell crank lever connected to said trailing edge aileron control means, said bell crank levers each having a limb with a free end, said free ends being spaced apart; a slotted link member; a movable fulcrum member connected to said wing tip position responsive means and also connected to said slotted link member, and further connected to said pilot operable aileron control means, said free ends of each of said bell crank levers comprising a portion slidably engaging said slot, said slotted link member being movable in response to said wing tip position responsive means to position said pivotal connection of said movable fulcrum member centrally with respect to either of said free bell crank lever ends, the other of said free ends being disposed in one end of said slot for response to rotation of said slotted link member about said fulcrum.

FREDERICK F. CROCOMBE.
GEOFFREY T. HILL.

References Cited in the file of this patent

UNITED STATES PATENTS

| Number | Name | Date |
|---|---|---|
| 2,191,842 | Back | Feb. 27, 1940 |
| 2,209,863 | Tupta | July 30, 1940 |
| 2,316,885 | Ortega | Apr. 20, 1943 |
| 2,428,934 | Grille et al. | Oct. 14, 1947 |
| 2,509,272 | Karnuth et al. | May 30, 1950 |
| 2,534,764 | Focht | Dec. 19, 1950 |
| 2,538,602 | Taylor et al. | Jan. 16, 1951 |

FOREIGN PATENTS

| Number | Country | Date |
|---|---|---|
| 691,665 | Germany | June 3, 1940 |
| 917,753 | France | Jan. 21, 1947 |